(12) United States Patent
Billieres et al.

(10) Patent No.: US 6,523,591 B1
(45) Date of Patent: Feb. 25, 2003

(54) TIRE BEAD WITHOUT BEAD CORD

(75) Inventors: Jean Billieres, Clermont-Ferrand (FR); Pierre Durif, Enval (FR)

(73) Assignee: Compagnie Generale des Etablissements Michelin-Michelin & Cie, Clemont-Ferrand Cedex (FR)

(*) Notice: Subject to any disclaimer, the term of this patent is extended or adjusted under 35 U.S.C. 154(b) by 0 days.

(21) Appl. No.: 09/569,706

(22) Filed: May 12, 2000

Related U.S. Application Data

(63) Continuation of application No. PCT/EP98/06832, filed on Oct. 28, 1998.

(30) Foreign Application Priority Data

Nov. 14, 1997 (FR) .............................. 97 14409

(51) Int. Cl.$^7$ ................................ B60C 9/02
(52) U.S. Cl. ................ 152/548; 152/539; 152/543; 152/547; 152/549
(58) Field of Search ................ 152/539, 543, 152/550, 454, 547, 548, 549

(56) References Cited

U.S. PATENT DOCUMENTS

| | | | | |
|---|---|---|---|---|
| 2,966,933 A | | 1/1961 | Boussu et al. ............... 152/362 |
| 3,547,178 A | | 12/1970 | Boileau ....................... 152/381 |
| 3,815,652 A | * | 6/1974 | Pouilloux .................... 152/542 |
| 5,660,656 A | * | 8/1997 | Herbelleauu ................. 152/547 |
| 5,702,548 A | * | 12/1997 | Arnaud ........................ 152/547 |
| 5,849,117 A | | 12/1998 | Billieres ..................... 152/543 |
| 5,961,756 A | * | 10/1999 | Ahouanto ................... 152/540 |
| 6,116,313 A | * | 9/2000 | Pereira ........................ 152/547 |

FOREIGN PATENT DOCUMENTS

DE 19537188 6/1996

\* cited by examiner

*Primary Examiner*—Michael W. Ball
*Assistant Examiner*—Justin Fischer
(74) *Attorney, Agent, or Firm*—Baker Botts L.L.P.

(57) ABSTRACT

A tire to be mounted on a rim of axial width L, with flanges with rounded rim hooks, having a tread joined to two beads (3) by two sidewalls (2) and at least one carcass reinforcement (1) formed of at least one ply of reinforcement elements, characterized in that each bead (3) is without a bead wire, the carcass reinforcement (1) having in each bead (3) a meridian profile which is curved axially and radially from the outside to the inside to form an axially inner edge located in an angle a open axially and radially towards the inside, one of the edges of which is parallel to the axis of rotation, the carcass reinforcement (1) being reinforced in each bead (3) at least radially to the outside and axially to the inside by at least one first continuous additional layer (6), of meridian profile substantially parallel to the meridian profile of the carcass reinforcement (1) in the bead (3) and including at least one first section composed of at least one ply ($6_1$, $6_2$, $6_3$) of inextensible reinforcement elements forming an angle of between −2.5° and +2.5° with the circumferential direction.

25 Claims, 7 Drawing Sheets

TIRE BEAD WITHOUT BEAD CORD

This is a continuation of PCT/EP98/06832, filed Oct. 28, 1998.

BACKGROUND OF THE INVENTION

The invention relates to a tire comprising at least one tread joined to two beads by means of two sidewalls and a carcass reinforcement, said tire being able to be used with or without an independent inner tube and being intended, after mounting on a standardized rim and after inflation, to be fitted on any vehicle capable of rolling.

The tires may be mounted on several types of standardized rim. Said rims may have frustoconical seats inclined relative to the axis of rotation, forming with said axis an angle which may be between 4° and 16°. Among the latter, there are integral rims which are then referred to as hollow rims, semi-hollow rims or even drop-center rims, or rims made of several sections which are referred to as interim or "advanced" rims. The rims in question may also have rim seats parallel to the axis of rotation and are generally referred to as flat-based.

The most frequently used rims, referred to as hollow or drop-center rims, comprise a mounting groove, the diameter of which is distinctly less than the nominal diameter of the rim. This rim groove diameter is considered by users to be too small, and it does not make it possible to select brake drums of dimensions suitable for effective braking of vehicles which are becoming ever more powerful.

It is furthermore highly desirable, whatever the reasons (reducing the pressures exerted by the tire on the ground, increasing the transverse stiffness of the tire, increasing the available internal space of the rim, lowering the center of gravity of certain types of machinery, to name but a few), to produce tires, the H/S form ratio of which is reduced, H being the height of the tire on its rim and S its maximum axial width.

The development of tires with reduced form ratios, more particularly intended to be fitted on heavy vehicle-type vehicles, such as lorries, buses, subway trains and tractor-trailer units, or of the very large heavy-vehicle type, such as loading, transport and earthmoving machinery used in construction, or aircraft machinery, is very delicate; in particular, the endurance of the beads becomes significantly less as the H/S ratio decreases, the inadequacies in endurance being found at the ends of upturns of the carcass reinforcement or the ends of reinforcement plies located in the beads of the tire, the structure of said beads being a conventional structure with, in each bead, a carcass reinforcement upturn and reinforcement plies, the meridian profiles of which are substantially parallel to the meridian profile of the carcass reinforcement in the zone of said beads. Furthermore, such form ratios, despite the possible reduction in the inflation pressures, involve a notable lack of comfort, which may be quite unbearable in the case of tires traveling long distances on relatively bumpy roads.

In order to overcome such disadvantages and to facilitate the production of tires, Application FR 94/14688 proposes a tire of form ratio of less than 0.8, intended to be mounted on a hollow rim or a drop-center rim, the seats of which are inclined relative to the axis of rotation by an angle which may be between 4° and 16°. Said tire has a carcass reinforcement, surmounted radially by a crown reinforcement, the carcass reinforcement being composed of at least one ply of cords or cables and being turned up in each bead about an anchoring bead wire, passing from the outside to the inside to form an upturn, said upturn being reinforced by at least one additional reinforcement ply of metal cables, oriented by an angle of between 0° and 20° relative to the circumferential direction, the value 0° being included in said range, and the meridian profile of said reinforced upturn, in the tire not mounted on its rim, being substantially parallel to the meridian profile of at least the portion of the seat located axially to the inside of the projection of the center of the circle circumscribed on the bead wire on said rim seat.

Although the production methods of a tire are currently very highly developed, the use of bead wires requires separate production and treatment of said bead wires (coating, for example), the transport and positioning of the same bead wires on a building drum or on a given support for manufacture of the bead, all operations which require time and multiple precautions, and which are therefore costly. Furthermore, since current tires are subjected to ever-increasing driving torques, the compromise between clamping on the rim which is necessary to avoid inopportune rotations and maximum clamping to permit mounting on the rim is difficult to control by the person skilled in the art in the current structures of tires with bead wires around which a carcass reinforcement is wound.

SUMMARY OF THE INVENTION

It has been discovered that the distribution of the contact pressures between the rim and the tire at the level of the respective rim and bead seats can be controlled and rendered as regular as possible in a very simple and reproducible manner while permitting an improvement in the resistance to unwinding of the carcass reinforcement in the event of a high degree of heating of the beads.

Thus, the tire according to the invention which is intended to be mounted on a standardized rim of axial width L, with rim flanges with rounded hooks, comprising a tread joined to two beads by two sidewalls and at least one carcass reinforcement formed of at least one ply of reinforcement elements, is characterized in that, viewed in meridian section, each bead is without a bead core or wire, said carcass reinforcement having in each bead a curved meridian profile which is formed axially and radially from the outside to the inside of at least one convex arc of a circle BC, possibly extended tangentially by a straight-line segment CD, to form a carcass reinforcement edge in the bead, located in an acute angle open axially and radially towards the inside, one of the edges of which is parallel to the axis of rotation, and of a value of at most 25°, said carcass reinforcement being reinforced in each bead at least radially to the outside and axially to the inside by a first continuous additional layer, of meridian profile substantially parallel to the meridian profile of said carcass reinforcement in the bead and comprising at least one section composed of at least one ply formed of inextensible reinforcement elements forming an angle of between −2.5° and +2.5° with the circumferential direction, the radially upper end of said one section of the additional ply being distant from the axis of rotation by an amount at least equal to 0.96 times the distance between said axis and the point of the corresponding flange of the mounting rim farthest from said axis of rotation, and the axially inner end being distant from the equatorial plane by an amount at most 0.43 times the width L of the mounting rim.

"Rim flange, viewed in meridian section" is to be understood to mean the assembly formed by the part substantially perpendicular to the axis of rotation extended, firstly, radially to the outside, by a circular part, forming what is sometimes referred to as the rim hook, and secondly, radially to the inside, by the arc of a circle connecting the axially outer end of the rim seat to said assembly. "Meridian profile of a carcass reinforcement in a bead" is to be understood to mean the meridian profile of the geometric center line of said reinforcement, viewed in meridian section, said profile being considered radially to the inside of a straight line parallel to the axis of rotation of the mounting rim and of the tire passing through the point of the rim hook, corresponding to the bead in question, the farthest from the axis of rotation.

"Inextensible reinforcement element" is to be understood to mean a cable or a monofilament having a relative elongation of at most 1.5% under a force of 20% of the breaking load. The additional layer will preferably be formed of metal cables or monofilaments, preferably of steel, in the case of tires of the "heavy vehicle" or "construction" type, but may advantageously be formed of textile elements, preferably of aromatic polyamide, in the case of tires for airplanes, agricultural tractors or passenger cars, for example.

A large number of rims and tires may be covered by the invention; the meridian profile of the assembly formed by the carcass reinforcement and the first additional layer, which profile is very closely linked to the profile of the carcass reinforcement, will, within a bead, be advantageously adapted to the meridian profile of the side of the rim on which said bead will be mounted. The meridian profile of the additional ply in effect does not differ from the meridian profile of the carcass reinforcement except by the possible variation of the rubber decoupling layer existing between the two plies, which explains why the two profiles are said to be substantially parallel.

Said meridian profile of the carcass reinforcement in a bead may advantageously be completed, radially and axially towards the inside, by a first, concave, arc of a circle extended tangentially by a second, convex, arc of a circle, said second arc of a circle possibly being extended tangentially by a straight-line segment.

The radially outer end of the first, concave, arc of a circle is radially distant from the axis of rotation by an amount equal to the radius of the circle which is the geometric locus of the points of the rim flange which are farthest from said axis. Said radially outer end is also the point of tangency with the convex meridian profile of the carcass reinforcement in the sidewall. The center of curvature of the first arc of a circle, relative to the two axes which are the trace of the equatorial plane and the axis of rotation, has the same coordinates as the center of curvature of the rim hook. As for the length of said first arc of a circle of the carcass reinforcement profile, it is at least zero, the meridian profile of the carcass reinforcement in the bead beginning directly with the second, convex, arc of a circle and at most equal to the length of an arc of a circle the radially lower end of which would be the point of tangency of said arc with a line perpendicular to the axis of rotation.

Said first arc of a circle is tangentially extended radially and axially to the inside by a second arc of a circle of a radius of curvature which may be between a minimum value of 5 mm and a maximum value equal to the radius of curvature of the meridian profile of the carcass reinforcement in the sidewall measured at the point of tangency between said profile and the first arc of a circle, said maximum value being the value of radius used preferably when the first arc of a circle has a length of zero.

The second arc of a circle is possibly tangentially extended radially and axially to the inside by a straight-line segment, the axially inner end of which is also the end of the meridian profile of the carcass reinforcement. The axially inner edge of the meridian profile is composed either of part of the second arc of a circle to which the straight-line segment is added, or of part of an arc of a circle. Said edge is the part of the meridian profile located in an angle defined by a half line forming a tangent to the second arc of a circle and forming an angle of 25° with the axis of rotation and a half line parallel to said axis of rotation, the origin of which is precisely the point of tangency of the second arc of a circle with the half line oriented at 25°.

The first additional layer has an axially inner end which may be closer to or farther away from the equatorial plane than the axially inner end of the carcass reinforcement. Between its axially inner end and the vertex of the angle in which the edge of the meridian profile of the carcass reinforcement is located, the first additional layer may be separated from the carcass reinforcement by a low thickness of rubber mix, a total of the two respective thicknesses of the calendering layers of the two adjacent plies, whereas between said vertex and the radially upper end said thickness is between 1.0 and 1.8 times the thickness previously mentioned.

As described above, some tires may have a carcass reinforcement formed of textile elements. The end of the meridian profile of the carcass reinforcement can then not be merged with the end of said reinforcement, the latter being able to be turned up over the first additional layer.

In the case of tires having a high recommended inflation pressure, the first additional layer may be formed of two sections of several additional plies of inextensible reinforcement elements, superposed on one another, the lengths of which may or may not be the same. If the presence of inextensible elements is necessary for the entire first section of the additional layer located radially to the inside of a straight line parallel to the axis of rotation and located at a distance from said axis equal to 0.96 times the distance between said axis and the point of the corresponding flange of the mounting rim farthest from said axis of rotation, the possible second section of the additional layer extending the first section, located radially to the outside of said straight line, and therefore in the bead and even in the sidewall of the tire, may be formed of reinforcement elements which are either inextensible or have a certain extensibility or at least render said section extensible; thus continuous elements can be used for said part which are preferably metal ones and are said to be elastic, that is to say, having a relative elongation of at least 1.5% under a tensile force equal to 20% of the breaking load, or undulating or zigzag elements in the plane of the ply or plies forming the layer, or even of circumferentially discontinuous elements, each element having a circumferential length which may be between 0.1 and 1 times the circumferential length of the ply and the gaps between elements being meridianly offset relative to the gaps of the axially adjacent rows.

In the case of a high inflation pressure, the presence of a second continuous additional reinforcement layer may also prove very advantageous. Said second layer, axially to the outside and radially to the inside of at least the radially innermost and axially outermost ply of the carcass reinforcement, also has a meridian profile substantially parallel to the meridian profile of said carcass reinforcement in the bead. Said layer is formed of at least one ply of reinforcement elements. It may be continuous and homogenous over its entire length from its radially upper end which may be located radially to the outside, but preferably radially to the inside, of the straight line parallel to the axis of rotation of the rim and passing through the point of the rim flange, corresponding to the bead in question, which is farthest from the axis of rotation, until its axially inner end closest to the equatorial plane. It is then advantageously formed of inextensible cables, preferably metal ones, forming an angle of between −2.5° and +2.5° with the circumferential direction. The second additional layer may also be non-homogenous over its width although continuous: it is then formed of two sections, or of three sections.

In the case in which its radially upper end is radially to the inside of the straight line parallel to the axis of rotation and passing through the point of the rim flange farthest from said axis of rotation, said second layer comprises a first section included between its radially upper end and a point located between the center of the second arc of a circle of the meridian profile of the carcass reinforcement in the bead and the vertex of the angle a in which the edge of the carcass reinforcement is located, and a second section, extending the first section axially to the inside and radially to the inside and included between said point and its radially lower end axially closest to the equatorial plane. The first section is formed of at least one ply of inextensible cables, while the second section is advantageously formed of at least one ply of reinforcement elements, said ply having the properties of being only very slightly compressible in the transverse direction and advantageously extensible in the circumferential direction, which, firstly, permits simple and reproducible control of the pressures exerted by the bead seat on the rim seat, the inventors having unexpectedly noted that said pressures were a function of the resistance to tension of the reinforcement elements constituting the ply (plies) of the second section of the second additional layer, and, secondly, facilitates the laying during manufacture of said additional layer.

In the event that the radially upper end of the second additional layer is radially to the outside of the straight line parallel to the axis of rotation and passing through the point of the rim flange farthest from said axis of rotation, the second layer may then comprise, in addition to the first and second sections previously described, a third section substantially located radially above the straight line parallel to the axis of rotation and passing through the point of the corresponding rim flange farthest from said axis of rotation.

The first section is formed of at least one ply of inextensible cables, preferably metal ones made of steel, and forming an angle between −2.5° and +2.5° with the circumferential direction. The second section is advantageously formed of at least one ply of reinforcement elements, said ply having the properties of being only slightly compressible in the transverse direction and advantageously extensible in the circumferential direction, which, firstly, permits simple and reproducible control of the pressures exerted by the bead seat on the rim seat, the inventors having unexpectedly noted that said pressures were a function of the resistance to tension of the reinforcement elements constituting the ply (plies) of the second section of the second additional layer, and, secondly, facilitates the laying during manufacture of said additional layer. As for the third section, it is advantageously formed of at least one ply of reinforcement elements, said ply having the property of being extensible in the circumferential direction.

The ply (plies) of the second and third sections of the second additional layer may thus be formed of elastic, continuous, rectilinear reinforcement elements oriented circumferentially, said reinforcement elements preferably being metal or textile ones, like the elements referred to above and used for the second section of the first additional layer. They may be formed of undulating or zigzag reinforcement elements of circumferential average orientation, or of rows of discontinuous reinforcement elements, with the same characteristics as those referred to previously, said elements or rows of elements however in this case being parallel to each other and practically adjacent in the transverse direction. The ply (plies) of said second section may also be formed of metal reinforcement elements oriented at an angle of at least 80° relative to the circumferential direction, said elements being circumferentially separated from each other by a distance of at least 0.2 mm. It may be advantageous in this latter case to provide one (several) width(s) of said ply (plies) sufficient to be able to turn it (them) up over the end of the carcass reinforcement. Furthermore, the laying of the second section of the second layer may be facilitated further if the ply (plies) of said section are formed of strips of several circumferential reinforcement elements, which strips are circumferentially discontinuous, the discontinuity gaps between strips forming with the circumferential direction an angle which is different from the angle formed with the same direction by the reinforcement elements of the carcass reinforcement, the difference being at least 10°.

In the event that the carcass reinforcement is formed of at most three plies, the second additional layer, whatever the number of plies and whatever the nature of the elements of which it is composed, is preferably located in its entirety axially to the outside and radially to the inside of the carcass reinforcement. In the event that the carcass reinforcement is formed of at least four plies, the plies forming the second additional layer are such that two of them may advantageously tightly surround a group which may be formed of one, two or three carcass reinforcement plies.

DESCRIPTION OF THE DRAWINGS

The characteristics and advantages of the present invention will be better understood with reference to the following description, which refers to the drawings, in which.

DESCRIPTION OF PREFERRED EMBODIMENTS

Figure 1:
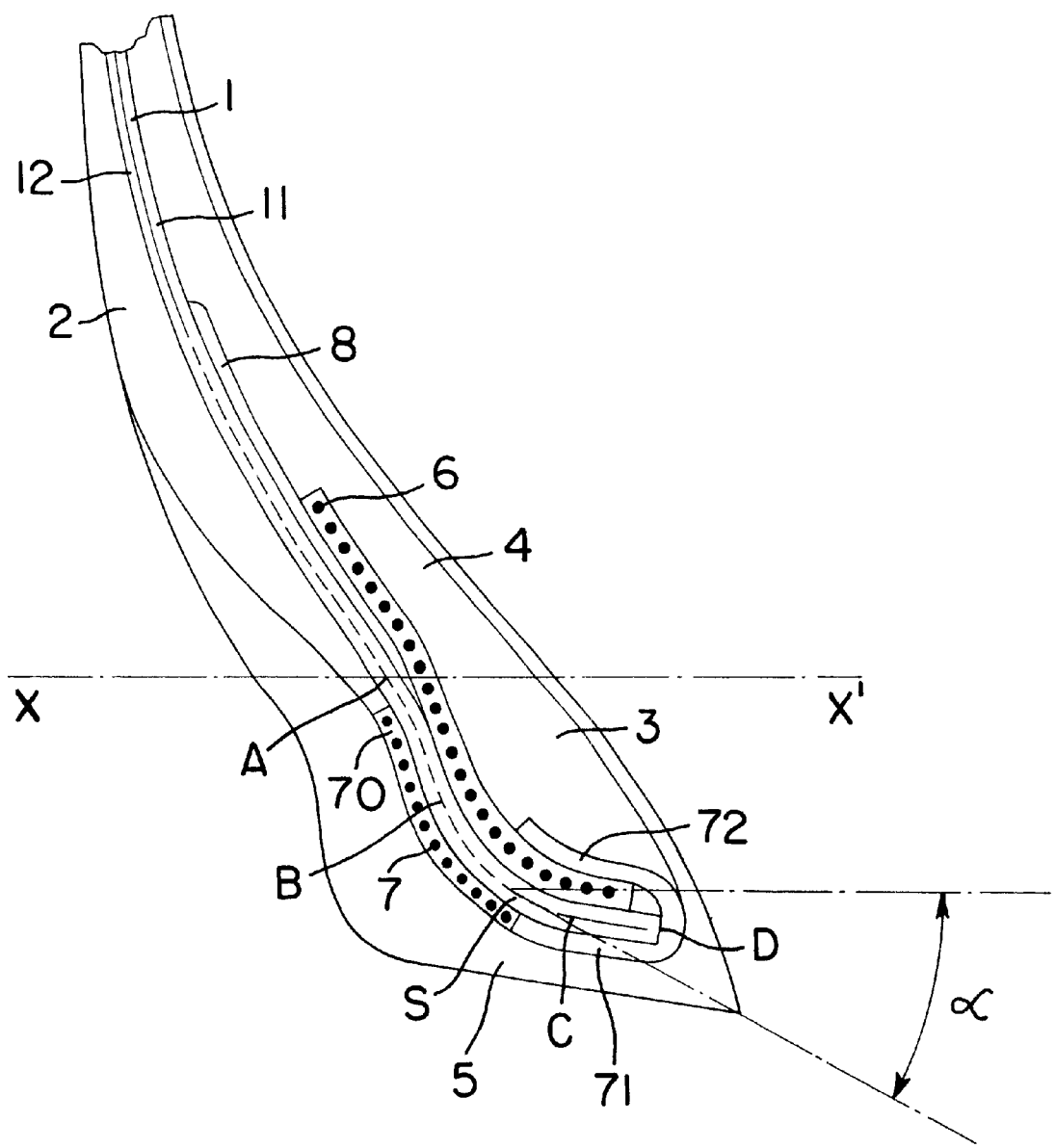
FIG. 1 shows a diagram, viewed in meridian section, of a bead of a tire for an agricultural tractor according to the invention.

The tire of dimension 540/65 R 26, for an agricultural tractor (FIG. 1), has an H/S form ratio of 0.65. The tread of said tire (not shown) is joined to the beads 3 by means of two sidewalls 2. Said tire is reinforced by a radial carcass reinforcement 1 surmounted by a crown reinforcement (not shown), and said carcass reinforcement is composed of two radial textile plies of 140×2 nylon cables 11 and 12. The meridian profile of the geometric center line (shown in dashes) of said reinforcement, viewed in meridian section, said profile being considered radially to the inside of a straight line XX' parallel to the axis of rotation of the mounting rim and of the tire passing through the point of the rim flange, corresponding to the bead in question, farthest from the axis of rotation, is formed by a first, concave, arc of a circle AB, forming a tangent at A to the meridian profile of the carcass reinforcement in the sidewall 2 and at B to a second, convex, arc of a circle BC, which itself is extended tangentially and axially to the inside by a straight-line segment CD, D being the end of the carcass reinforcement 1, located axially at 0.4 times the rim width L of the equatorial plane. Since said tire is intended to be mounted on a rim of dimension DW 15, the standardized width of which is 381 mm, and the points of the rim flanges of which farthest from the axis of rotation are located on a circle of a radius of 356 mm, the point A is at a distance from the axis of rotation of 345 mm, and distant axially from the equatorial plane (not shown) by an amount equal to 183 mm. The point B, which is the point of tangency with the second arc of a circle BC, is also the point of tangency with a straight line perpendicular to the axis of rotation, the arc of a circle AB thus having the maximum length. Said meridian profile is therefore curved passing axially and radially from the outside to the inside to form an axially inner edge SD, located in an angle a which is open axially and radially to the inside, one of the sides of which, which forms an angle of 25° with the axis of rotation, is at a tangent to the second arc of a circle BC at S, and the other side of which, starting from S, is parallel to said axis of rotation.

The carcass reinforcement 1 in the bead 3 is reinforced axially to the inside and radially to the outside by an additional ply 6 of inextensible steel 68×23 cables, of a diameter of 2.8 mm, the breaking load of which is at least 700 daN, which are oriented at 0° relative to the circumferential direction. Said ply 6 has one radially upper end above the straight line XX' and one radially lower end close to the end of the carcass reinforcement. It is separated from the carcass reinforcement 2 by a rubber decoupling layer 8 having the special feature of being thicker in the pseudo-vertical section of the carcass reinforcement/additional ply assembly, while it is only equal to the total of the two calendering thicknesses of the cables of the carcass ply and of the additional ply respectively in the pseudo-horizontal section. Said rubber layer has a modulus of elasticity in tension (secant modulus) of at least 30 for a relative elongation of 10%.

Radially to the inside and axially to the outside, there is present a second additional ply 7 which is formed in its first section 70 of continuous steel 68×23 cables, said cables being inextensible and oriented relative to the circumferential direction by an angle of at most 2.5°. Said second additional ply 7 is parallel in its first section 70 to the meridian profile of the carcass reinforcement 1 in the bead 3 in question. While the radially upper end of said second additional ply 7 is slightly located to the inside of the straight line XX' parallel to the axis of rotation passing through the point of the rim hook farthest from the axis of rotation, the first section 70 of said ply 7 has its radially lower end located on the same line perpendicular to the axis of rotation as the point S of the meridian profile of the carcass reinforcement 1. Said first part 70 of the additional ply 7 is extended axially by a second part 71 parallel to the meridian profile of the carcass reinforcement 1 and formed of 9×28 cables, oriented at an angle of 90° relative to the circumferential direction. The second section 71 is turned up over the ends of the carcass reinforcement 1 and of the first additional ply 6 to form an upturn 72. All the plies are covered radially to the outside with the conventional protective rubber layer 5 intended to establish contact with the mounting rim. The entire bead is completed by one (or more) rubber filler(s) 4 axially to the inside and radially to the outside of the additional layer 6.

Figure 2:
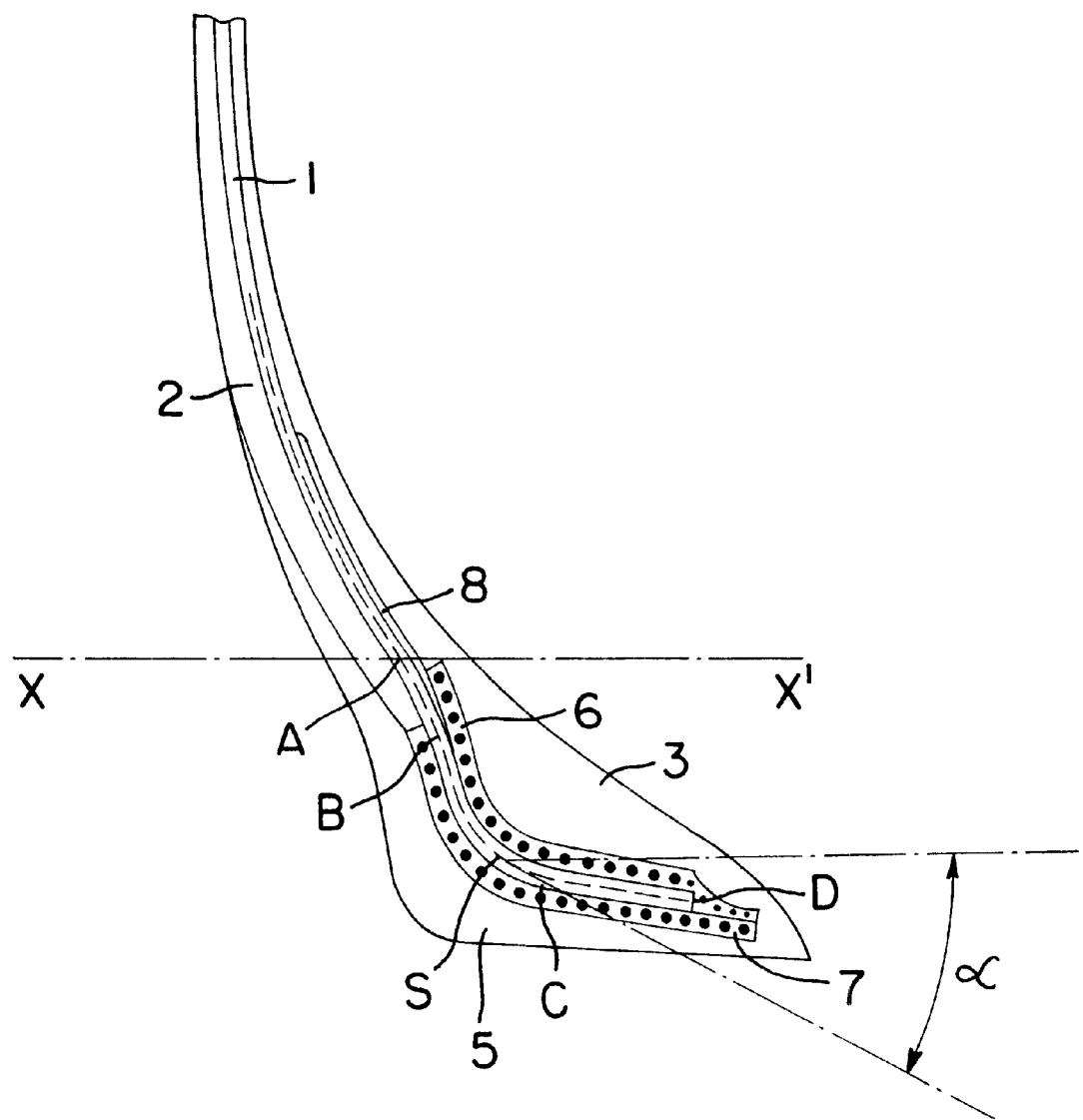
FIG. 2 shows a diagram, viewed in meridian section, of a bead of a tire for a passenger car according to the invention.

The tire of dimension 175/70 R 13 shown in FIG. 2 is a tire for a passenger car. Taking the same references as those of FIG. 1 to designate the same elements, said tire comprises a carcass reinforcement 1 formed of a single textile ply 1 of polyester cables. As previously, the meridian profile of the carcass ply 1 in the bead 3 is composed of the arc of a circle AB, which is tangent to the arc BC, which itself is a tangent and extended by the straight-line segment CD. The carcass reinforcement is reinforced in the bead firstly, radially to the outside and axially to the inside, by a first additional ply 6 formed of 9×28 metal cables of steel, oriented circumferentially, and secondly, radially to the inside and axially to the outside, by a second additional ply 7, the two sections of which are formed of the same 9×28 cables and are also oriented circumferentially. If the radially upper ends of the two additional plies 6, 7 respectively meet the conditions listed previously, the radially lower ends offer the special feature of being closer to the equatorial plane than the end of the carcass ply, the two edges of the additional plies becoming adjacent.

Figure 3:
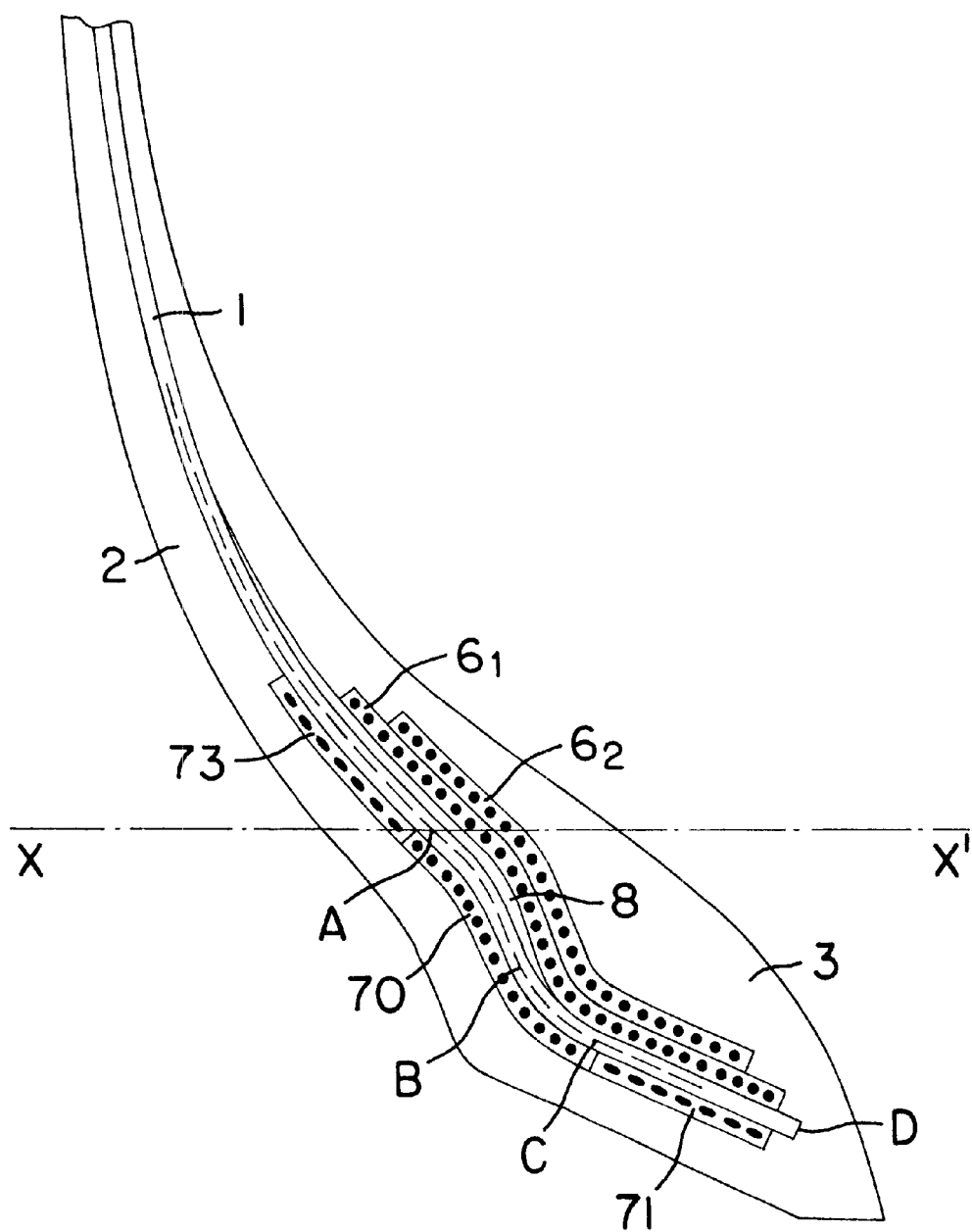
FIG. 3 shows a diagram, viewed in meridian section, of a bead of a tire for a "heavy vehicle" tire.

The "heavy vehicle" tire of dimension 385/65 R 22.5 (FIG. 3), intended to be mounted on a drop-center rim having rim seats inclined at 15°, comprises, taking the same references and as previously, a tread joined to two beads 3 by two sidewalls 2. A carcass reinforcement, formed of a single ply 1 of metal cables, made of steel, reinforces said tire. The meridian profile of the carcass ply 1 is still composed of the two arcs of a circle AB and BC, the arc BC being extended by a straight-line segment CD forming an angle of 20° with the axis of rotation. The point A is distant from the equatorial plane by an amount equal to 149 mm, namely 0.5 times the width of rim 11.75 on which the tire will be mounted, while the point D is distant from the same plane by an amount equal to 0.3 times the same rim width. The arc of a circle AB, as can be seen in FIG. 3, does not have the maximum possible length, owing to the special shape of the meridian profile of the flange of the 15°-seat rim, point B not being a point of tangency with a straight line perpendicular to the axis of rotation. The radially outer and axially inner additional layer 6 is formed of two plies $6_1$ and $6_2$ of 68×23 metal cables made of steel, oriented circumferentially, and the breaking load of which is at least 700 daN. The radially lower ends of the two plies are farther from the equatorial plane than the end of the carcass ply and the radially upper ends are radially to the outside of the straight line XX'. As for the second additional layer, it is formed of three parts:

a third section 73 extending from its radially upper end to a line parallel to the axis of rotation passing through the point A and formed of a ply of metal cables made of steel which undulate in the plane of said ply and are of average circumferential orientation and have a ratio a/λ of amplitude of undulation a to the wavelength λ which may be between 0.03 and 0.1; a first section 70, extending from the point A to a line perpendicular to the lowered axis of rotation of the point C of the meridian profile of the carcass reinforcement, and formed of a ply of inextensible metal 68×23 cables made of steel, oriented circumferentially and of a diameter of 2.8 mm, and axially to the inside starting from said point C a second section 71 formed of a ply of metal cables made of steel which undulate in the plane of the layer and ply of constitution identical to the ply forming the third section, that is to say with the same ratio a/A and with the same cables, of smaller diameter than that of the cables of the first part 70 since it is equal to 1.4 mm.

Figure 4:
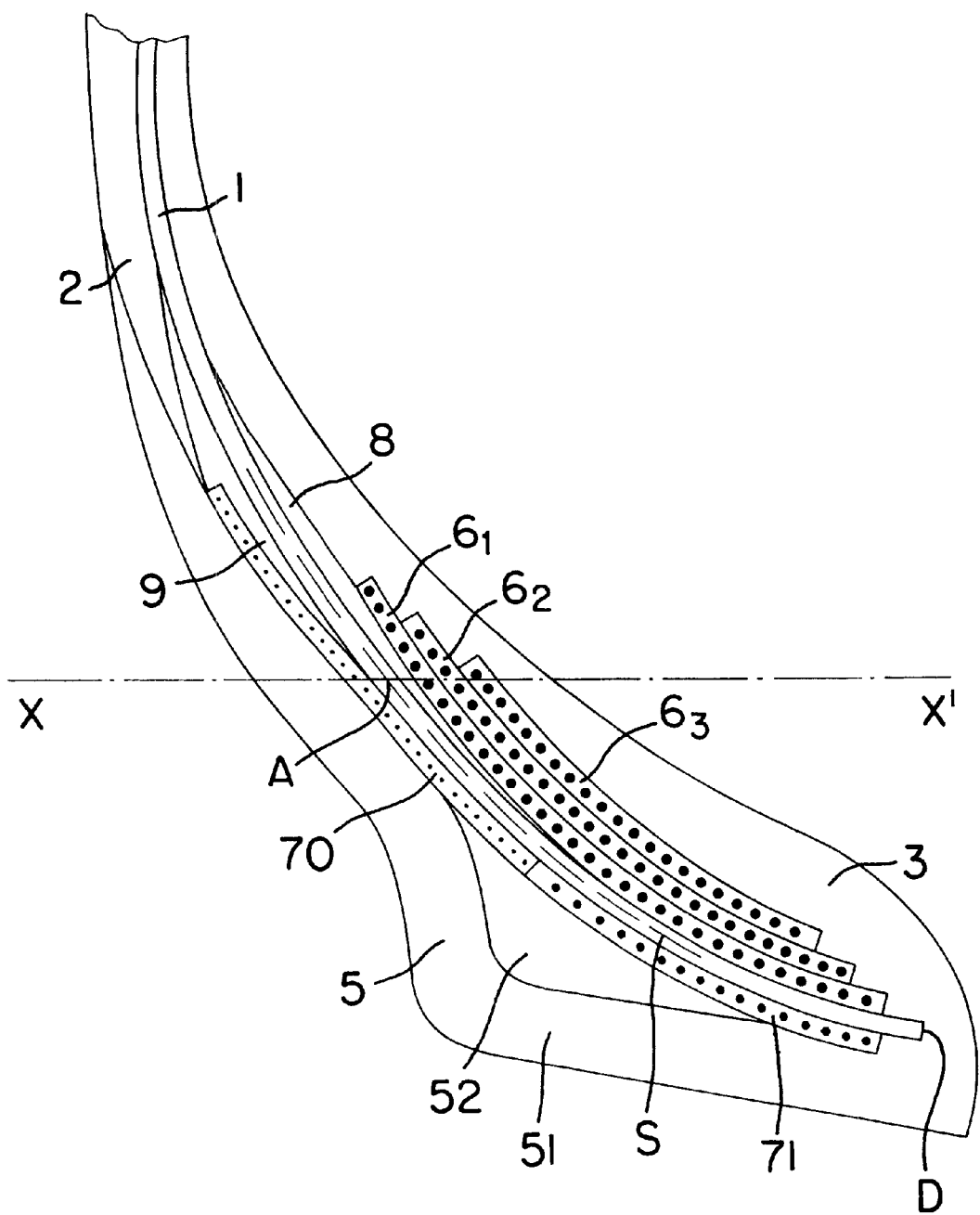
FIG. 4 shows a diagram, viewed in meridian section, of a bead of a tire for construction machinery according to the invention.

FIG. 4 shows a tire of dimension 26.5 R 25, intended firstly to be mounted on a rim of standardized width of 495 mm and with seats inclined, relative to the axis of rotation, by an angle of 5°, and secondly to be fitted on construction site machinery. The carcass reinforcement of said tire is, as in the previous example, composed of a single ply 1 of metal cables made of steel. The meridian profile of the carcass ply 1 offers the special feature of being formed only of a single arc of a circle AD, the arc of a circle AB in this case having a length of zero, and the straight-line segment CD being non-existent. The arc of a circle AD is at a tangent at A to the meridian profile of the carcass reinforcement 1 in the sidewall 2; its radius of curvature is equal to the radius of said profile of the carcass reinforcement at A and constant over the entire length AD. The point A is distant from the equatorial plane by an amount equal to 237 mm, or 0.48 times the rim width on which the tire in question will be mounted, and the point D is distant from the same plane by an amount equal to 0.36 times said rim width. The carcass reinforcement 1, in the bead, is reinforced axially to the inside and radially to the outside by an assembly 6 of three additional plies $6_1$, $6_2$, $6_3$ of inextensible metal 68×23 FR cables made of steel, oriented circumferentially, the diameter of which is equal to 2.8 mm and the breaking load of which is greater than 700 daN. Said three plies, of widths which decrease radially towards the outside, have their radially upper ends to the outside of the straight line XX' and their radially lower ends slightly farther from the equatorial plane than the end of the carcass reinforcement 1. Said three plies are radially above the point S (vertex of the angle defined firstly by the tangent to the arc of a circle BC forming an angle of 25° with the axis of rotation and secondly by a line parallel to said axis) decoupled from the carcass reinforcement by a layer of rubber 8 the thickness of which is 2 mm and the modulus of elasticity in tension of which at a relative elongation of 10% is 40 MPa. A second additional layer, composed of two sections 70 and 71, completes the structure in the bead in question. The first section 70, axially to the outside, is formed of at least one ply of inextensible metal 27×23 NF cables made of steel, while the second section 71 is formed of at least one ply of rows of inextensible metal cables made of steel which are circumferentially discontinuous, the gaps between lengths of cables being offset meridianly and the ply thus formed having a certain circumferential extensibility while being only very slightly compressible in the transverse direction. The axially inner end of the second section 71 is located axially to the outside of the radially lower end of the carcass reinforcement 1 and the width of said second section is preferably between 0.7 and 0.9 times the width of the frustoconical seat of the bead 3, while the radially upper end of the first section 70, which extends said second section, is located radially to the outside of the straight line XX', having the following special features: the portion located radially to the inside of the straight line XX' is adjacent to the carcass reinforcement 1, the respective cables of the two plies being separated from each other only by the conventional calendering thicknesses of the plies, while the portion located radially to the outside of the straight line XX' is greatly separated from the carcass reinforcement 1 by a layer 9 of rubber mix of a thickness of at least 2.5 mm and of the same secant modulus of elasticity in tension as that of the mix forming the layer 8. The meridian profile of the carcass reinforcement and of the assembly formed by said reinforcement and the additional layers is such that the rubber protective layer 5, providing the junction with the mounting rim, is greatly thickened at the level of the rounding of the bead joining the seat and the vertical section of said bead. It is then advantageous, as shown in FIG. 4, to divide the layer 5 into two sections: a first, outer, section 51 of substantially constant thickness providing the junction with the rim and a second, inner, section 52 in the form of a triangle and having the special feature of being formed of a rubber mix of high modulus of elasticity in tension compared with that of the mixture forming the section 51: for example, the secant modulus in tension at 10% relative elongation of the section 52 is at least 30 MPa, while said same modulus is equal to 6 MPa for the section 51.

Figure 5A:
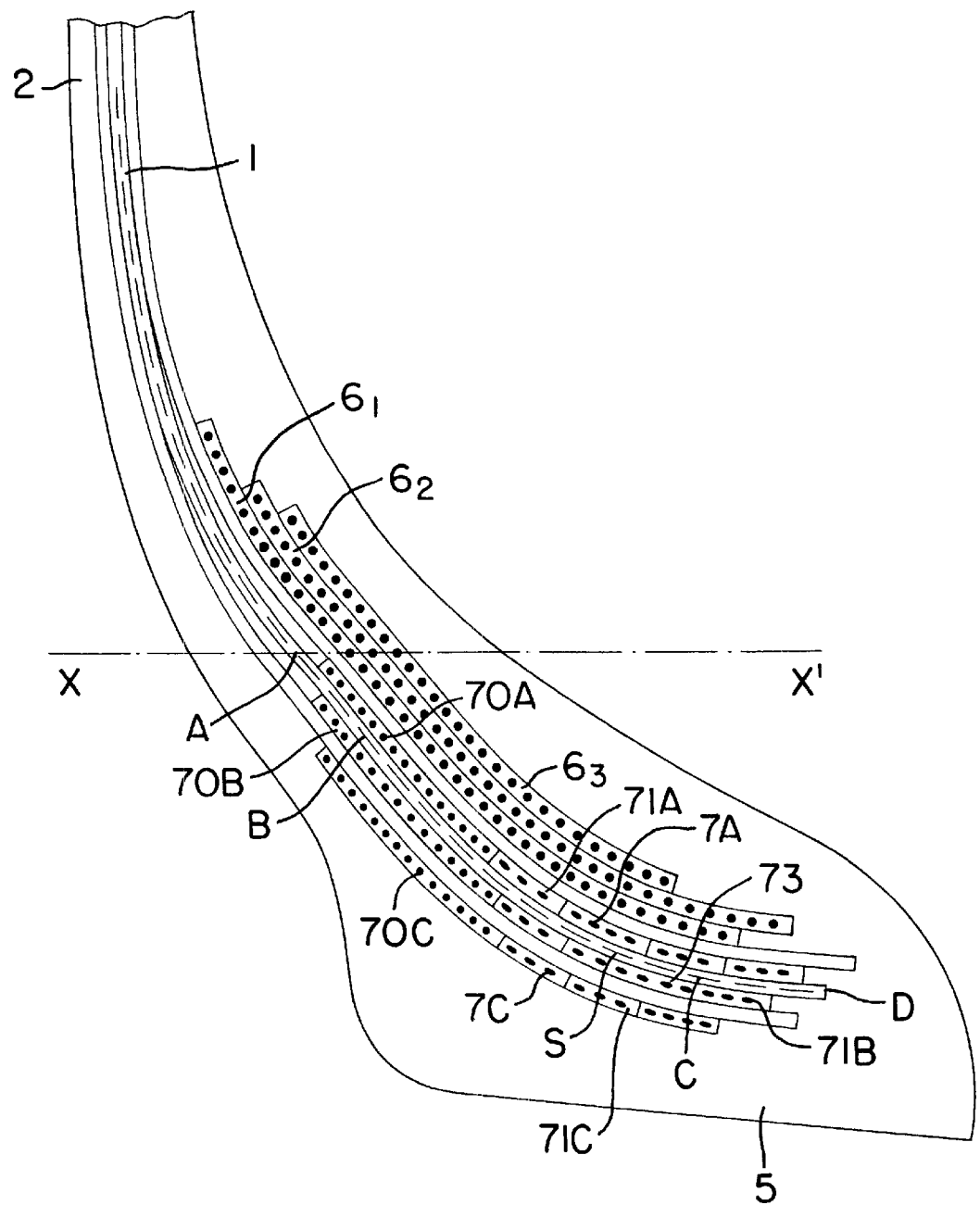
FIGS. 5A to 5C show a bead of a tire for an airplane, FIG. 5A showing a diagram of a first variant of a bead for a radial tire, FIG. 5B being a plan view of the second additional layer used in the case of FIG. 5A, and FIG. 5C showing a diagram of a second variant of a bead for a cross-ply tire.
Figure 5B:
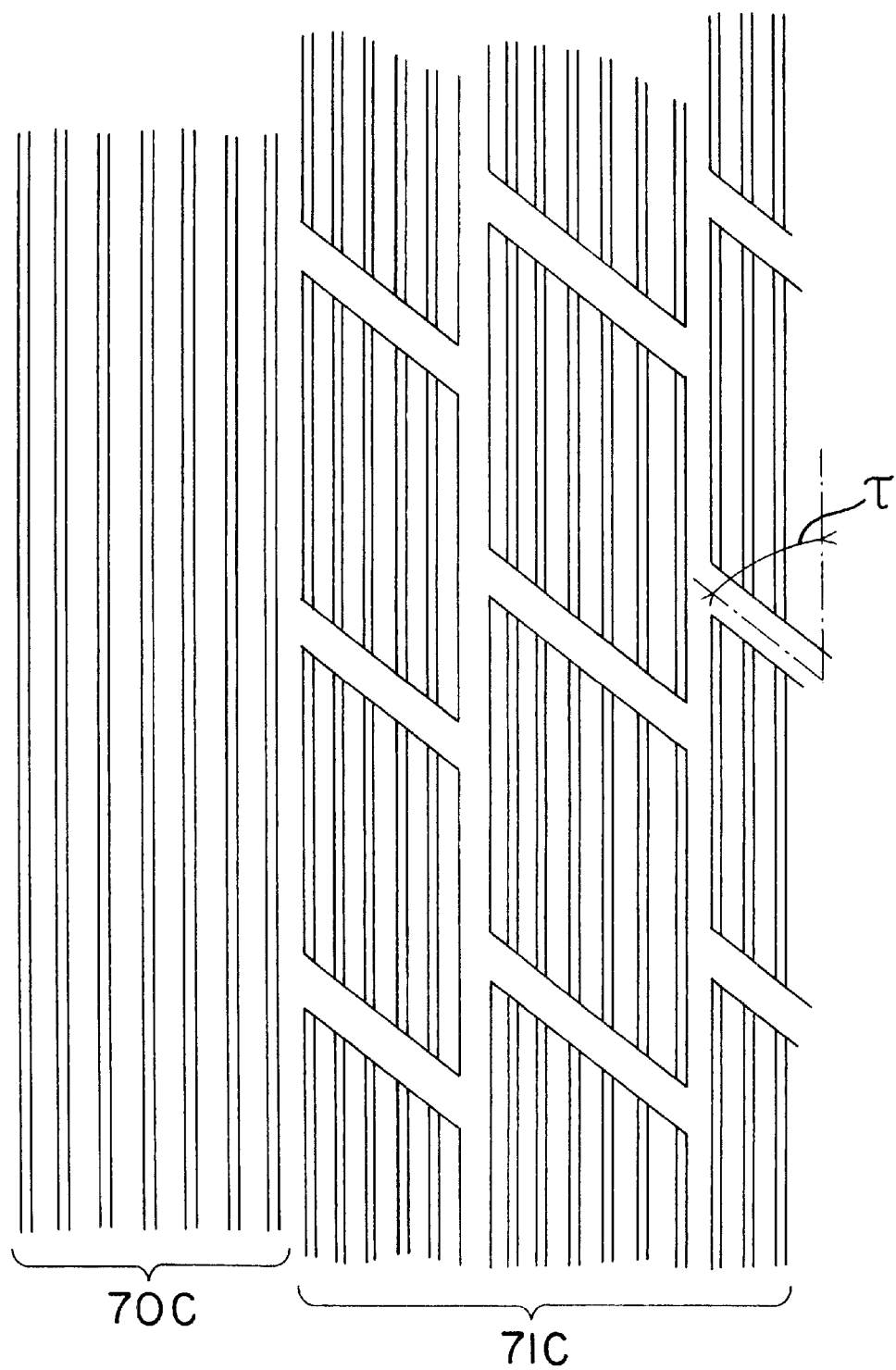

The example described and illustrated in FIGS. 5A and 5B relates to an airplane tire of dimension 40×14.19, intended to be mounted on a 9.5×19 rim of axial width of 241 mm and having seats inclined at 5°. The tire in question is a tire with radial carcass reinforcement 1 comprising a plurality of carcass plies, 6 in number. The profile of the geometric center line of the carcass reinforcement 1 (marked in dashes) is still formed of the arcs of a circle AB and BC, the latter being extended axially to the inside by a straight-line segment CD and D being the end of said carcass reinforcement 1, located at a distance equal to 0.15 times the rim width of the equatorial plane. The first additional layer 6 is formed of three plies $6_1$, $6_2$, $6_3$ of inextensible metal 68×23 FR cables made of steel, of a diameter of 2.8 mm and a breaking load of at least 700 daN. The second additional layer 7 is formed firstly of two plies 7A, 7B, each additional ply 7A, 7B being inserted between two groups of two carcass reinforcement plies and, secondly, a third additional ply 7C radially to the inside and axially to the outside of the radially innermost and axially outermost group of two carcass plies. Each of the three plies 7A, 7B, 7C is formed of a first section 70A, 70B, 70C, formed of inextensible, circumferential metal 68×23 FR cables made of steel, and of a second section 71A, 71B, 71 C composed of strips of ten metal 27×23 NF cables made of steel, said strips being circumferentially discontinuous and the lines of discontinuity forming, with the circumferential direction, an angle τ, which is in no case equal to the angle formed by the cables of the radial carcass reinforcement, and preferably differing by at least 10° therefrom. The strips are arranged axially in the desired number to obtain the desired axial width of each of the plies of the second section (FIG. 5B), and may be arranged end to end, or with a certain overlap.

Figure 5C:
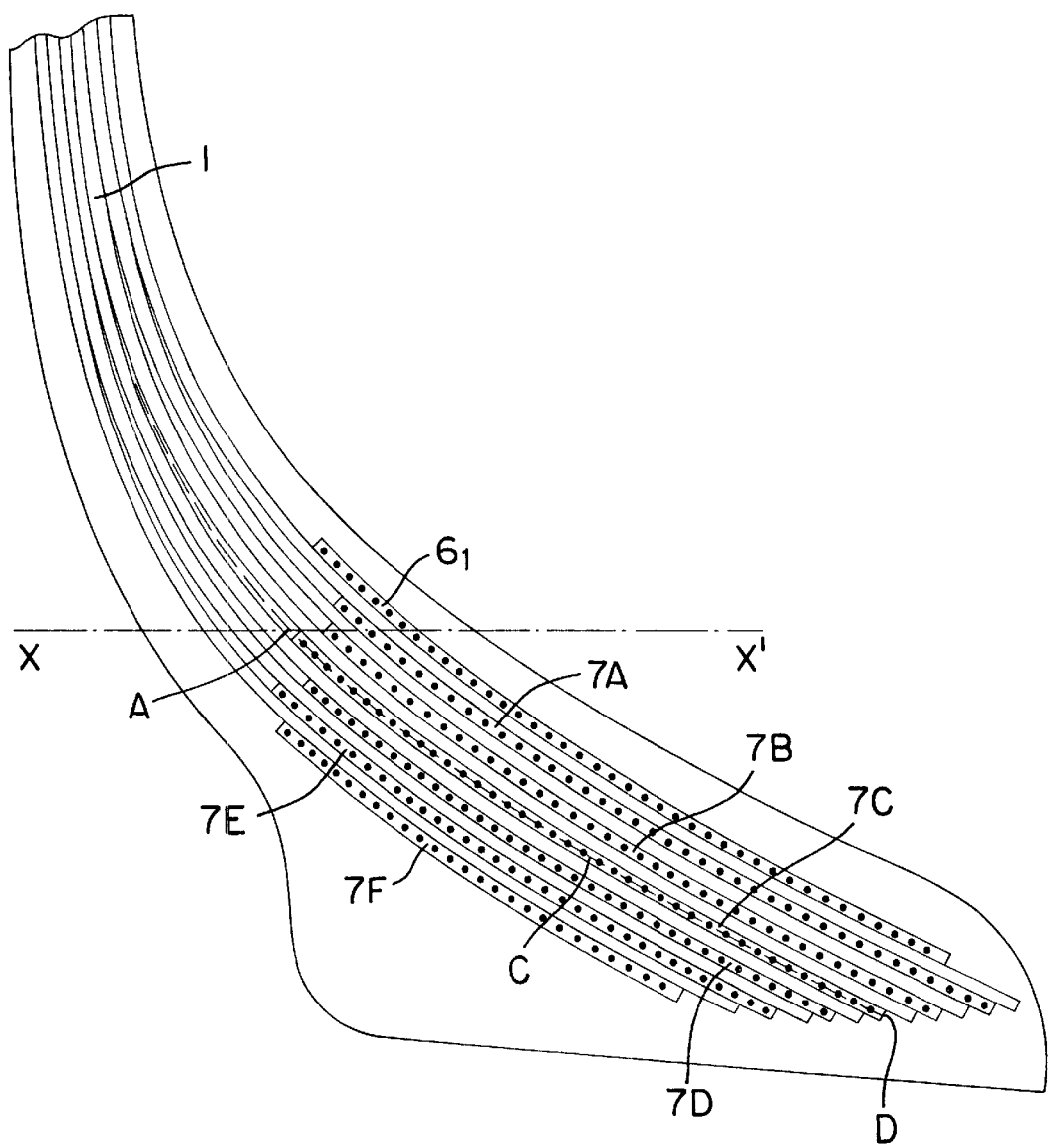

The second example described and illustrated in FIG. 5C also relates to an airplane tire of the same dimension as before. The tire in question is this time a cross-ply tire, comprising a plurality of carcass plies, of an even number of 12, of nylon cables crossed from one ply to the next. The large number of carcass plies, contrary to the case described previously, results in a profile of the geometric center line of the carcass reinforcement 1 (marked in dashes) which is without the arc of a circle AB, the point B being merged with point A, the arc of a circle BC being extended axially towards the inside by a straight-line segment CD and D being the end of said center line of the carcass reinforcement 1. The first additional layer 6, radially to the outside and axially to the inside, is formed of a single ply 6, of circumferential, inextensible metal 68×23 FR cables made of steel, while the second additional layer 7, radially to the inside and axially to the outside of the radially outermost and axially innermost group of two carcass plies is formed firstly of five plies 7A to 7E, each ply 7A, 7B ... 7E being held tightly between two groups of two carcass plies and, secondly, of a sixth ply 7F axially to the outside and radially to the inside of the radially innermost and axially outermost group of two carcass plies. Said plies 7 are all formed of inextensible, circumferential metal 68×23 cables made of steel.

We claim:

1. A tire which is intended to be mounted on a standardized rim of axial width L, with rim flanges with rounded hooks, comprising a tread joined to two beads by two sidewalls and at least one carcass reinforcement formed of at least one ply of reinforcement elements, characterized in that each bead is without a bead wire, said at least one carcass reinforcement having in each bead a curved meridian profile which is formed axially and radially from the outside to the inside of at least one convex arc of a circle BC, possibly extended tangentially by a straight-line segment CD, to form an edge of said at least one carcass reinforcement in the bead, said edge being located within an acute angle a which opens axially and radially towards the inside, the radially outer side of the angle cc being parallel to the axis of rotation and the radially inner side being inclined relative thereto at a value of at most 25°, said at least one carcass reinforcement being reinforced in each bead at least radially to the outside and axially to the inside by at least one first continuous additional layer having a meridian profile substantially parallel to the meridian profile of said at least one carcass reinforcement in the bead and comprising at least one first section composed of at least one ply of inextensible reinforcement elements forming an angle of between −2.5° and +2.50 with the circumferential direction, the radially upper end of said at least one first continuous additional layer being distant from the axis of rotation by an amount at least equal to 0.96 times the distance between said axis of rotation and the point of the corresponding flange of the mounting rim farthest from said axis of rotation, and the axially inner end of said at least one first continuous additional layer being distant from the equatorial plane by an amount of at most 0.43 times the width L of the mounting rim.

2. A tire according to claim 1, characterized in that the meridian profile of said at least one carcass reinforcement furthermore comprises, radially and axially towards the outside, a first, concave, arc of a circle AB, said arc of a circle AB being extended by a second, convex, arc of a circle BC, and having a length at most equal to the length of an arc of the circle AB which terminates at the point of tangency of the radially lower end B thereof with a line perpendicular to the axis of rotation.

3. A tire according to claim 2, characterized in that the radially outer end A of the first, concave, arc of a circle AB is the point of tangency of said arc AB with the convex meridian profile of said at least one carcass reinforcement in the sidewall, and radially distant from the axis of rotation by an amount equal to the radius of the circle which is the geometric locus of the points of the rim flange which are farthest from said axis of rotation, the center of curvature of said arc AB, relative to the two axes which are the trace of the equatorial plane and the axis of rotation, having the same coordinates as the center of curvature of the rim hook.

4. A tire according to claim 2, characterized in that the second arc of a circle BC, which is at a tangent at B to the first arc of a circle AB, has a radius of curvature of between a minimum value of 5 mm and a maximum value equal to the radius of curvature of the meridian profile of said at least one carcass reinforcement in the sidewall measured at the point of tangency A between said meridian profile and the first arc of a circle AB, said maximum value being the value of radius used when the first arc of a circle AB has a length of zero.

5. A tire according to claim 1, characterized in that the axially inner edge of the meridian profile of said at least one carcass reinforcement comprises a section of the second arc of a circle BC to which the straight-line segment CD is added, the angle ac within which said axially inner edge of the meridian profile is located being defined by (1) a half line forming a tangent at S to the second arc of a circle BC and forming with the axis of rotation an angle of 25° and (2) a half line parallel to said axis of rotation and having an origin S at the point of tangency of the second arc of a circle BC with the half line oriented at 25°.

6. A tire according to claim 1, characterized in that said first continuous additional layer is composed of at least a first section and a second section, wherein the second section of said first continuous additional layer is located radially to the outside of a straight line parallel to the axis of rotation and located at a distance from said axis of rotation equal to 0.96 times the distance between said axis of rotation and the point of the corresponding flange of the mounting rim farthest from said axis of rotation.

7. A tire according to claim 6, characterized in that the first and second sections of the first continuous additional layer are superposed on one another, have lengths which may or may not be the same, and are formed of inextensible circumferential metal reinforcement elements.

8. A tire according to claim 6, characterized in that the second section of said first continuous additional layer is formed of circumferential elements, such that said second section is extensible in the circumferential direction, said circumferential elements being by themselves extensible, or inextensible but arranged in said second section so that said second section is extensible.

9. A tire according to claim 1, characterized in that the first continuous additional layer, between its axially inner end and the vertex S of the angle a in which the edge of said at least one carcass reinforcement is located, is separated from said at least one carcass reinforcement by a minimal thickness of rubber mix, which thickness is the total of the thicknesses of the calendering layers facing the adjacent plies of said first continuous additional layer and said at least one carcass reinforcement, respectively, whereas between said vertex S and the radially upper end of said first continuous additional layer the decoupling thickness is between 1.00 and 1.80 times the above minimal thickness.

10. A tire according to claim 1, characterized in that said at least one carcass reinforcement is reinforced, axially to the outside and radially to the inside, of at least the radially innermost and axially outermost ply of said at least one carcass reinforcement, by a second additional continuous layer, formed of at least one first section of at least one ply of reinforcement elements, having a meridian profile substantially parallel to the meridian profile of said at least one carcass reinforcement in the bead, and formed of inextensible circumferential reinforcement elements.

11. A tire according to claim 10, characterized in that the radially upper end of the second continuous additional layer is radially to the inside of a straight line XX' parallel to the axis of rotation of the rim and passing through the point of the rim flange, corresponding to the bead in question, which is farthest from said axis of rotation.

12. A tire according to claim 11, characterized in that the second continuous additional layer is of homogenous composition formed, in its entirety, of inextensible cables forming an angle of between −2.5° and +2.5° with the circumferential direction.

13. A tire according to claim 11, characterized in that the second continuous additional layer is formed of two sections, a first section between its radially upper end and a point located approximately between the center of the arc of a circle BC and the vertex S of the angle α in which the edge of said at least one carcass reinforcement is located, and a second section between said point S and its axially inner end, the first section being formed of at least one ply of circumferential, inextensible reinforcement elements, while the second section is formed of at least one ply of reinforcement elements, such that said second ply has the properties of being only very slightly compressible in the transverse direction and extensible in the circumferential direction.

14. A tire according to claim 10, characterized in that the radially upper end of the second continuous additional layer is radially to the outside of a straight line XX' parallel to the axis of rotation of the rim and passing through the point of the rim hook, corresponding to the bead in question, farthest from said axis of rotation.

15. A tire according to claim 14, characterized in that the second continuous additional layer is formed of three sections, a first section included between its radially upper end and a point located approximately between the center of the arc of a circle BC and the vertex S of the angle α in which the edge of said at least one carcass reinforcement is located, a second section included between said point S and its axially inner end, and a third part substantially located radially above the straight line parallel to the axis of rotation and passing through the point of the corresponding rim flange farthest from said axis of rotation, and extending the first section radially to the outside, the second section and the third section each being formed of at least one ply of reinforcement elements such that the ply has the properties of being only very slightly compressible in the transverse direction and extensible in the circumferential direction.

16. A tire according to claim 13 or 15, characterized in that the reinforcement elements forming the second section of the first continuous additional layer and of the second section of the second continuous additional layer are elastic, continuous, rectilinear reinforcement elements oriented circumferentially, said elements being parallel to each other and practically adjacent in the transverse direction.

17. A tire according to claim 13 or 15, characterized in that the reinforcement elements forming the second section of the first continuous additional layer, and the second section of the second continuous additional layer are undulating or zigzag reinforcement elements in the plane of the at least one ply, of circumferential average orientation, having a ratio of amplitude of undulation to the wavelength between 0.03 and 0.1, said elements being parallel to one another and practically adjacent in the transverse direction.

18. A tire according to claim 13 or 15, characterized in that the at least one ply forming the second section of the first continuous additional layer, and the second section of the second continuous additional layer are formed by rows of discontinuous reinforcement elements, each element having a circumferential length between 0.1 and 1 times the circumferential length of the ply which they form, and the gaps between elements being offset meridianly relative to the gaps of the axially adjacent rows, said rows of elements being parallel to one another and practically adjacent in the transverse direction.

19. A tire according to claim 13 or 15, characterized in that the reinforcement elements forming the second section of the second continuous additional layer are metal reinforcement elements oriented at an angle of at least 80° relative to the circumferential direction, said elements being circumferentially separated from each other by a distance of at least 0.2 mm.

20. A tire according to claim 13 or 15, characterized in that the at least one ply of the second section of the second continuous additional layer is formed of strips of several circumferential reinforcement elements, said strips being circumferentially discontinuous, and the discontinuity gaps between strips forming with the circumferential direction an angle which is different from the angle formed with the same direction by the reinforcement elements of said at least one carcass reinforcement, the difference being at least 10°.

21. A tire according to claim 10, characterized in that said at least one carcass reinforcement is formed of at most three plies, the second continuous additional layer being located in its entirety axially to the outside and radially to the inside of the radially innermost and axially outermost carcass ply of said at least one carcass reinforcement.

22. A tire according to claim 10, characterized in that said at least one carcass reinforcement is formed of at least four plies, the plies forming the second continuous additional layer being such that two of them tightly surround a group of carcass plies formed of one or more carcass reinforcement plies.

23. A tire according to claim 1, characterized in that said at least one carcass reinforcement is composed of plies of reinforcement elements forming an angle of at least 85° with the circumferential direction.

24. A tire according to claim 1, characterized in that a protective rubber layer at the rim seat of the bead is divided into two sections at the level of a rounded section of the bead: a first section of substantially constant thickness and a second section of triangular shape formed of a rubber mix, the secant modulus of elasticity in tension of which at 10% relative elongation is at least equal to 30 MPa and greater than the secant modulus of elasticity of the mix forming the first section.

25. A tire according to claim 1, characterized in that a protective rubber layer at the rim seat of the bead is divided into two sections at the level of a rounded section of the bead: a first section of substantially constant thickness and a second section of triangular shape formed of a rubber mix, the secant modulus of elasticity in tension of which at 10% relative elongation is at least equal to 30 MPa, and in that the ratio of the secant modulus of the second section to the secant modulus of the first section is greater than 5.

\* \* \* \* \*